United States Patent [19]
Friedell

[11] 4,112,970
[45] Sep. 12, 1978

[54] OSCILLATION DAMPING PRESSURE RELIEF VALVE

[76] Inventor: Morley V. Friedell, Rte. 1, Box 175, Stevensville, Mont. 59870

[21] Appl. No.: 767,928

[22] Filed: Feb. 11, 1977

[51] Int. Cl.² .......................................... F16K 31/363
[52] U.S. Cl. .............................. 137/489.5; 137/492.5
[58] Field of Search ...................... 137/489, 489.5, 492, 137/488, 492.5; 251/61.3

[56] References Cited

U.S. PATENT DOCUMENTS

| | | | |
|---|---|---|---|
| 591,014 | 10/1897 | Schreidt | 137/489.5 UX |
| 2,352,898 | 7/1944 | Hill | 251/61.3 X |
| 2,587,212 | 2/1952 | Placette | 137/489.5 |
| 2,589,346 | 3/1952 | De Frees | 251/61.3 |
| 3,478,775 | 11/1969 | Friedell | 137/489.5 |

*Primary Examiner*—Alan Cohan
*Attorney, Agent, or Firm*—Phillip L. DeArment; Gay Chin; Donald E. Zinn

[57] ABSTRACT

A primary pilot relief valve senses a predetermined tank pressure of a fluid pressure source and connects that source to one sealed chamber on one side of an actuating piston fixed to, but fluid isolated from, the main poppet which is maintained in valve closed position within a main valve body also open to the fluid pressure source, by fluid pressure acting within another chamber on the opposite side of the actuating piston, which, being isolated from the pressure changes which occur as the main valve opens, can rapidly modulate the fluid flow. A secondary pilot relief valve controls the pressure in the one chamber if the fluid source pressure drops below a predetermined lower pressure from that initiating primary pilot valve operation as a result of source pressure drop due to opening of the main valve poppet caused by failure of the primary pilot valve, to thereby control the tank pressure at a lower but acceptable level.

8 Claims, 3 Drawing Figures

OSCILLATION DAMPING PRESSURE RELIEF VALVE

BACKGROUND OF THE INVENTION

Field of the Invention

This invention relates to pressure relief valves or the like and more particularly to such valves which are prone to self-oscillation.

Pressure relief valves generally function to cause the valve poppet to open either against or in the direction of fluid flow from the tank or other container which is subject to a varying pressure, however the instant that the valve poppet opens within the pressure relief line, the release of the fluid under pressure tends to reduce the pressure within the container subject to pressure relief, causing the poppet valve to tend to reverse its direction, that is, shift back towards closed position, and in many cases, high velocity oscillation and chattering of the poppet results, particularly where the pressure relief valves are mounted within a valve casing which is essentially remote from the tank or container with which it functions.

Prior pressure relief valves generally oscillate due to a reverse flow-energy poppet control system. Attempts to achieve a chatter-proof relief valve have been made, but these are particularly inapplicable where the pressure relief valve which opens to the interior of a tank above an accumulated liquid requires that the pressure relief valve be connected by means of a vent line which extends for a substantial distance through the liquid being stored and provided with a relief valve which operates at a point quite remote from the source of pressure. Under these installation conditions, there is of necessity required a very long standpipe vent line leading to the pressure relief valve and preferably a tank top sensor for actuation of the control device responsive to pressure variation for, in turn, opening the valve poppet at the bottom of the standpipe vent line.

Conventional pressure relief valves normally employed for tank top pressure relief are not satisfactory for mounting to the bottom of the tank without extensive alterations and are not satisfactory in operation when shifted to that position. The problem is that conventional main valve design is not adaptable to the inherent time delay due to the extensive length of the standpipe vent line leading to the valve, the valve is prone to self-oscillation unless pilot feedback can be almost instantaneous, and the valve will amplify any "organ pipe" oscillation occurring in the standpipe as well as its own starting or initial opening instability, mentioned previously.

The present invention is directed to the utilization of a primary pilot relief valve for controlling the relief pressure level over the entire flow range from main valve poppet cracking to full flow, and to a main valve actuator piston which is isolated from the main relief valve chamber and so is unaffected by and can damp out pressure oscillations and perturbations occurring within the valve body due to initiation of flow past the main valve.

Further, in many applications, the function of the pressure relief valve is to insure that it shall fail closed. With a single pilot system, there is no way to assure that any pilot controlled pressure system cannot fail closed or open or even with some complex dual systems.

The present invention has for its further object a control system employing multiple pilot valves in which dual failures are required to fail the valve open, while permitting a single failure to fail it closed.

It is a further object of this invention to provide a multiple pilot valve operated pressure relief valve which insures upon failure of any part of the dual pilot system that the valve will surely fail closed.

It is yet another object of this invention to provide a multiple pilot valve control pressure relief system in which dual pilot valve failures are required to fail the main poppet valve open or closed.

SUMMARY OF THE INVENTION

The present invention may take the form of a tubular main valve casing forming a main flow passage and having an inlet end open to a source of fluid under pressure and means defining a circular valve seat within the main flow passage downstream of the inlet end. A circular main valve poppet is coaxially mounted within the flow passage of said casing for movement, in the direction of fluid flow from the source and away from the valve seat, from a first, closed position to a second, open position. A poppet valve actuator piston is operatively coupled to the valve poppet and fluid isolated from the main valve passage with an actuator casing sealably and slidably supporting the actuator piston and defining first and second sealed chambers on opposite sides of the actuator piston. The actuator piston has a larger effective surface area than that of the valve poppet and biasing means are provided for normally biasing the valve poppet to the first, fully closed, position in absence of fluid connection of said main valve casing to said pressure source. Further, means are provided for continually subjecting the first chamber to the source pressure such that the actuator piston maintains said valve poppet at said first, fully closed position in addition to said biasing means. A primary pilot relief valve is directly connected to the fluid pressure source and is set to relieve at the upper predetermined value. This valve vents into the second chamber, and when the pressure forces on the valve poppet and two sides of the piston balance, the poppet will begin to open. As the pressure rises beyond the cracking pressure, the pilot valve flow increases. The pressure in the second chamber increases, overcoming the biasing spring rate/force and opening the main valve further, until equilibrium is established.

The second chamber is vented by way of a restricted passage to the downstream side of the valve poppet of the main flow passage.

A secondary pilot relief valve is operatively positioned within the passage venting the second chamber to provide pilot valve controlled pressure relief of the valve poppet at a lower pressure level than that actuating the primary pilot relief valve.

A shaft member may be mounted coaxially within the tubular main valve casing and slidably mounted within a header barrier which spans the tubular casing upstream of the inlet to the main valve casing and which fluid isolates the actuator piston from the main valve poppet. An axial portion of the tubular valve casing which extends beyond said header barrier to the side opposite said poppet acts to define with said header barrier said first and second chambers on respective sides of said actuator piston. The main valve casing may be essentially of inverted L-shaped configuration including an elongated inlet duct which opens at right angles to a base portion of said main valve casing with the header barrier extending across said base portion adjacent to and upstream of the inlet duct connection, the main valve poppet being fixed to said shaft and spanning across the base portion downstream of said inlet duct with the base portion terminating downstream of the main valve poppet in an outlet end, across which is positioned a fixed spider. The header barrier and the fixed spider may each comprise journal bearings for the valve shaft which slides axially relative to the base portion of the tubular L-shape valve casing. A compression spring mounted concentrically about a portion of the shaft is compressed between the spider and the main valve poppet for biasing the valve poppet in the direction of the header barrier and in valve closed position against the valve seat.

The valve casing base extension portion may terminate to the side of the actuator piston opposite that of the header barrier in a transverse end wall with an extension of the shaft projecting through the transverse end wall and the end wall carrying a vent valve actuator cylinder concentrically surrounding the projecting portion of the shaft. A vent valve actuator piston is fixed to the shaft extension and slidably and sealably mounted within the vent valve actuator cylinder and defines therewith a pair of sealed fluid chambers on each side thereof. Means may be provided for subjecting the vent valve actuator cylinder chamber axially remote from the valve poppet to a source of fluid pressure sufficient to overcome the bias of the compression spring and the source pressure acting on the actuator piston within the first chamber to open the valve poppet. The extension portion of the shaft may further extend beyond the vent valve actuator cylinder and terminate in a peripherally relieved surface and the pressure relief valve may further comprise first and second axially spaced and fixedly positioned microswitches and actuator pins mounted for sliding movement at right angles to the axis of the shaft extension portion and being biased towards the piston by the microswitch such that shifting of the valve poppet and the valve shaft between the valve poppet first and second positions causes the state of the microswitches to vary, indicating the full open or full closed position of the valve poppet.

DESCRIPTION OF THE PREFERRED EMBODIMENT

Figure 1:
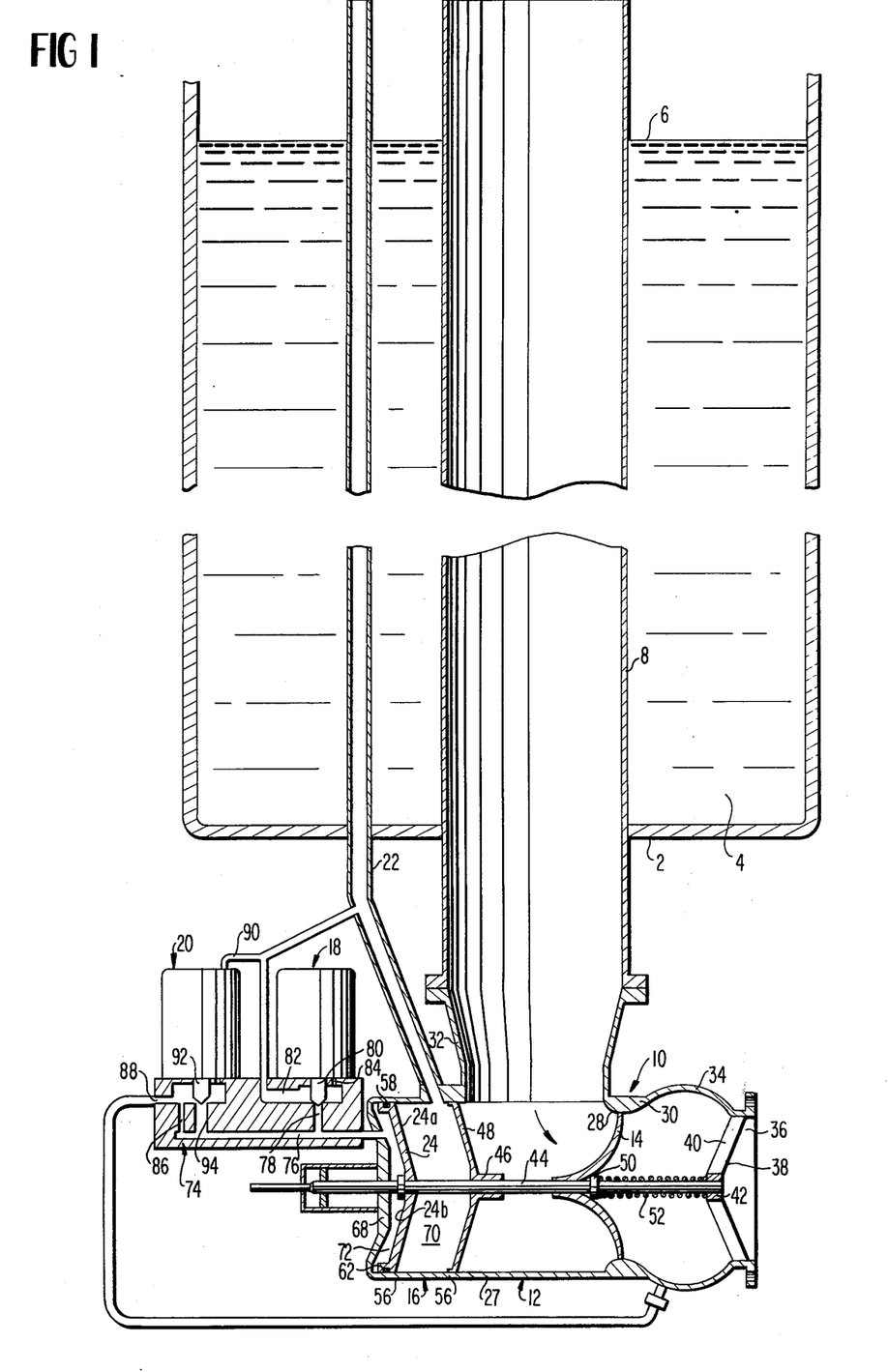
FIG. 1 is a simplified, partial schematic, sectional view of the improved oscillation damping pressure relief valve of the present invention as applied to a liquid storage tank for storage of liquid under gas pressure.

The improved oscillation damping pressure relief valve of the present invention has application to systems in which pressure vessels are connected by manifolds such as commercial tank farms or multi-tank launch vehicles with common vent systems or where the relief valve cannot be located in close proximity to the pressure vessel. For instance, as shown in FIG. 1, where of necessity, the pressure relief valve cannot be positioned on top of a liquid storage tank (normally the pressure relief valve is directly open to the top of the tank), the pressure relief valve may underlie the tank and open to that tank through a long length, vertical standpipe. In that respect, liquid storage tank 2 acts to store a liquid 4 at some level 6 and the pressure relief valve indicated generally at 10 is coupled by way of the relatively large diameter and relatively very long standpipe vent line 8 to the storage tank 2, the vent line 8 terminating at some point above the level 6 of the liquid 4 being stored.

By reference to FIG. 1, it is seen that the pressure relief valve comprises a number of principal elements. Essentially, an L-shape, tubular valve casing or housing 12 houses an axially slidable main line valve poppet 14, whose position is determined by way of a poppet actuator or fluid motor indicated generally at 16 under control of primary and secondary pilot or pilot relief valves 18 and 20, respectively. A pressure sensing line 22 of a diameter substantially smaller than that of the vent line 8 passes through the storage tank 2 and terminates at a point above the level of the liquid 4 being stored for sensing the gas pressure within the tank and utilizing that fluid pressure as the means for controlling the position of the actuating piston 24 of the poppet actuator motor 16. Piston 24 has faces 24a and 24b on opposite sides thereof. Further, it is that fluid pressure source which feeds to the primary and secondary pilot valves 18 and 20 to control their operation, to initiate pressure relief and to prevent oscillation of the main valve poppet 14 during pressure relief.

Figure 2:
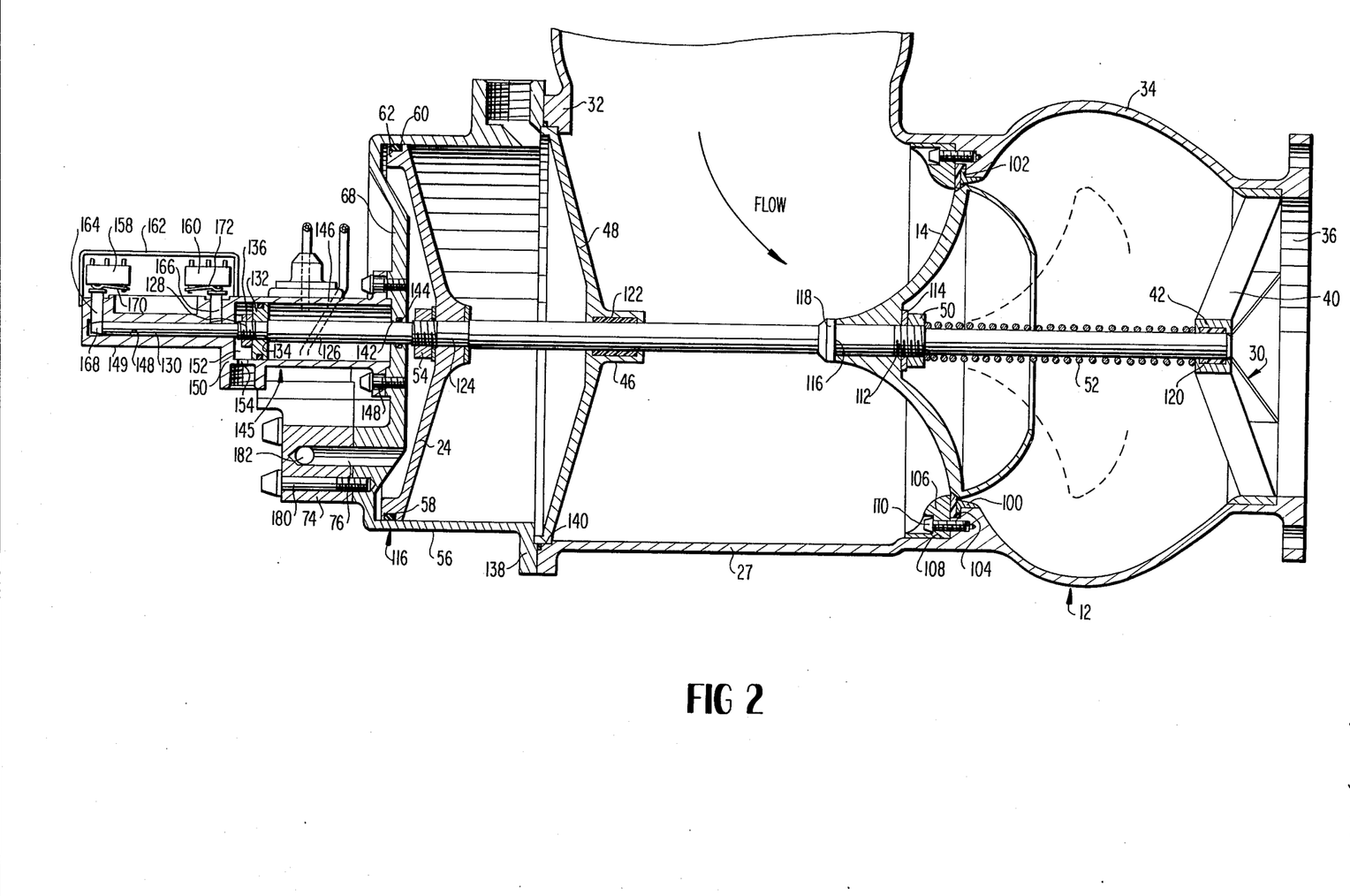
FIG. 2 is an enlarged, sectional view of the main valve and valve actuating piston assembly of the pressure relief valve of FIG. 1.

The relief valve shown in FIG. 1 is in simplified or partial schematic form. The major components constituted by the poppet actuator motor 16 and main valve casing and poppet 12 and 14 of FIG. 2, are shown in greater detail in FIG. 2. The primary and secondary pilot valves 18 and 20 are shown in greater detail in FIG. 3. The tubular L-shape housing or casing 12 comprises a cylindrical base 27 including a reduced venturi portion 30 defining an annular or circular valve seat 28 against which the arcuate valve poppet 14 seats. A tubular inlet portion 32 opens to the cylindrical base 27 at right angles such that the fluid flowing through the main valve casing 12 makes a right angle turn in the vicinity of the valve poppet 14, passes through the venturi section 30 and flows around the open poppet at the enlarged diameter spherical portion 34 downstream of venturi 30, the flow discharging through the outlet end 36 of the valve casing 12. A spider 38 comprised of a series of radial arms 40, extends transversely across the outlet end 36 of the valve casing and includes a journal bearing 42 which slidably receives one end of the main poppet valve shaft 44, this shaft also being slidably and sealably carried by a journal bearing 46 formed within the center of a solid, disc-like header barrier 48 which spans across the cylindrical valve casing 27 just upstream of the tubular inlet 32, thus defining a main poppet valve flow passage defined by the inlet 32, venturi portion 30, spherical portion 34, and outlet 36 of the valve casing 12, to one side of header barrier 48. The main valve poppet 14 is fixed to shaft 44, being mounted to that shaft by way of a threaded collar 50 against which one end of a compression coil spring 52 abuts. The coil spring 52 concentrically surrounds the valve shaft 55 and at its opposite end, abuts against the journal bearing 42 of the open spider 38, and is compressed therebetween. The main valve body or casing 12 may be of cast construction, and machined after casting, and may be formed of an appropriate light weight metal such as aluminum. The actuating piston 24 is of a diameter on the order of the interior diameter of valve casing extension section 56, and is sealably and slidably mounted therein. Casing section 56 may be an integral extension of tubular base 27 of valve casing 12 or constitute a separate element. Piston 24 may carry an O-ring 58 or the like which is mounted within a peripheral recess 60 of a rim portion 62 of the piston 24. A threaded collar 64 mounts the poppet actuator piston to shaft 44, against a shoulder formed by a reduction in diameter of the shaft 44.

Figure 3:
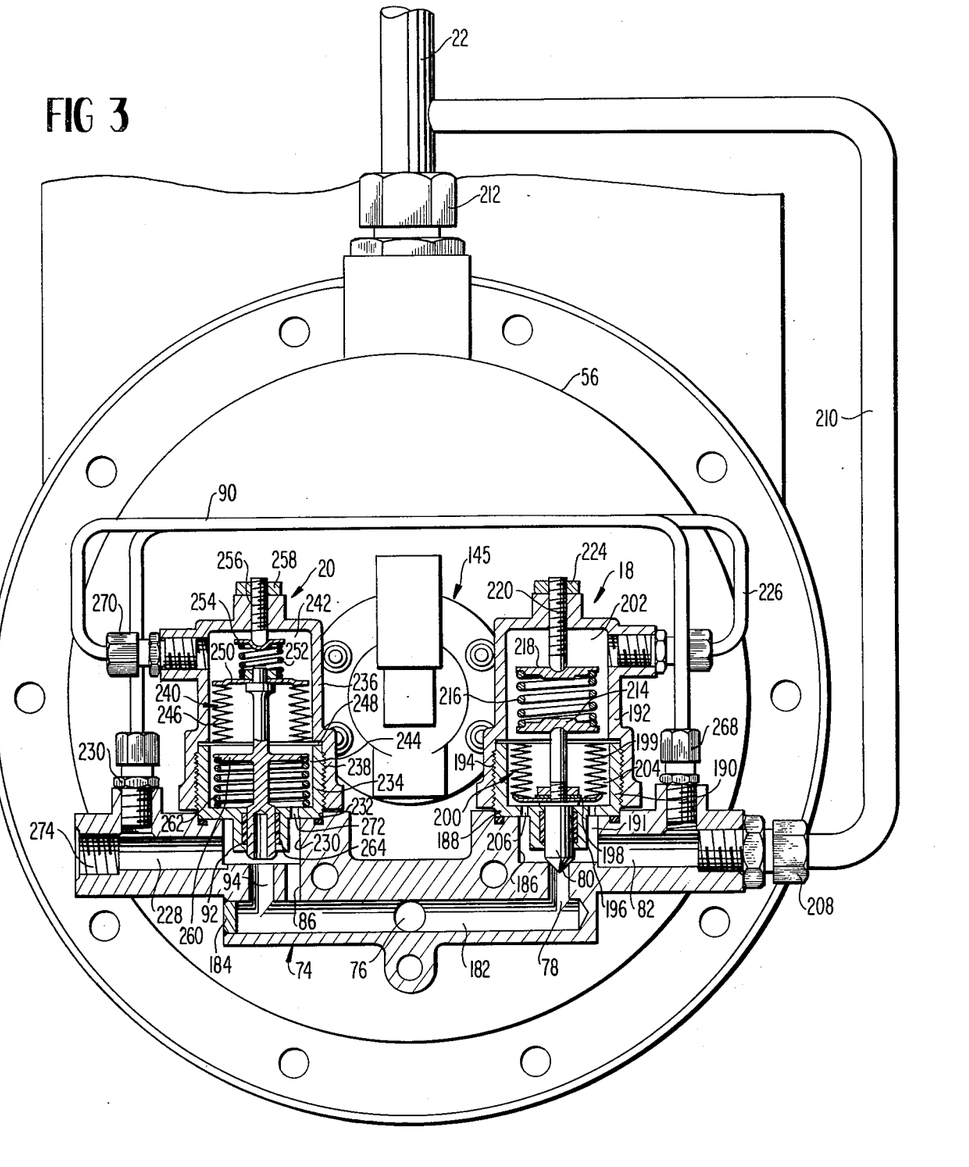
FIG. 3 is a sectional view of a portion of the primary and secondary pilot valves forming a portion of the pressure relief valve of FIG. 1.

A transverse end wall 68 which is integral with the poppet actuator cylinder casing extension 56 defines with the piston 24 and with the header barrier 48 a first, control chamber 70 between the piston 24 and the header barrier and a second, valve actuator chamber 72 between the end wall 68 and that piston 24. The pressure sensing line 22 is directly connected to and terminates at the casing section 56 and opens to the first control chamber 70 partially defined by piston face 24a. A fluid manifold indicated generally at 74 is provided with a fluid passage or conduit means 76 which opens through end wall 68 to the actuator chamber 72, partially defined by piston face 24b. This passage or conduit means 76 leads to primary pilot valve 18 by way of passage or conduit means 78, branching therefrom. The primary pilot valve 18 is provided with a spring biased bellows actuated valve plunger or needle 80 which closes off fluid communication between fluid passage or conduit means 82 leading from the pressure sensing line 22 to passage 76 via branch line 78, and thence to the actuator chamber 72. Passage 76 also functions to vent chamber 72 to the main poppet valve flow passage downstream of poppet 14. Passage 76 includes one or more ports 84 leading to a chamber within pilot valve 18 subjected to the source pressure, within which the bellows, as shown in FIG. 3, is provided. For the purposes of this illustration in FIG. 1 of the invention, in a simplified form, it is necessary only to know that the plunger or needle 80 is normally closed but may be opened in response to a predetermined pressure within the pressure sensing line. Thus, when the pressure within the storage tank 2 exceeds a predetermined value, the needle 80 unseats and regulated control pressure is applied to the face 72a of the actuating piston 24, via passage 76 to chamber 72. Chamber 70 is continually pressured by sensing line 22. The primary pilot valve therefore acts as a conventional pressure vent valve with a welded metal bellows sensing unit, with the actuating pressure vent flow being taken from the sensing line from the tank top, that is, through pressure sensing line 22. The primary pilot valve is designed to crack at 22.5 psi in the illustrated embodiment and to reach the full vent flow at 23.5 psi. The vent flow from the pilot valve 18 communicates with the chamber 72 between the transverse end wall 68 of the poppet actuator motor 16 and the poppet actuating piston 24 and also by way of bleed orifice 86 at the end of passage 76 to vent passage or conduit 88 which opens to the discharge side of the main valve poppet 14 within the spherical main valve body casing section 34.

The present invention advantageously employs a secondary pilot valve 20 to act as a reverse operating relief valve in that it further vents the control pressure line 76 and chamber 72 as required when the tank pressure reaches a predetermined value lower than that causing the primary pilot valve 18 to open. The secondary pilot valve can only function if the primary valve fails open with a flow in excess of the amount orifice 86 can handle, causing too high a pressure in chamber 72 and excessive venting from the main valve. In this case, a branch line 90 leads from line 82 which is in fluid communication with the pressure sensing line 22, and opens to the secondary pilot valve 20 chamber, within which is positioned a welded metal bellows, FIG. 3, which acts in opposite to a biasing spring for maintaining a valve plunger or needle 92 of the secondary pilot valve 20 in projected or closed position, that is, closing off conduit means or passage 94 leading to vent line 88. The secondary pilot valve 20, in being vented to the pressure sensing line 22, vents at a given pressure below that causing the primary pilot valve 18 to crack. In this case, it is set at a pressure for venting below 22 psi. From the cross-sectional size of the valve needle or plunger 92 and the passage 94 in comparison to plunger 80 and passage 78 associated with the primary pilot valve, it is readily seen that the secondary pilot valve has a much larger valve area than the primary pilot valve and vents from the vent flow line 76 of the primary pilot valve. The vent flow in passage 94 parallels the fixed orifice flow through orifice 86, both flows venting overboard in this case, through vent line 88 to the discharge end of the main valve casing 12.

In terms of the simplified structure of FIG. 1, therefore, the operation highlights two unique features of the pressure relief valve of this invention. The first feature comprises the dual level poppet control, that is, the initial control of the poppet at a given high pressure to initiate pressure relief, and the second and lower level for effecting closure of the poppet by additional venting of the valve actuating chamber by secondary pilot valve 20. The second feature is the provision of a fail-safe pilot control relief valve which requires dual failures to fail open or closed. The illustrated pressure relief valve provides a proof against failing open as a prime requisite of the external tank system. The main valve poppet 14 is closed by the compression spring 52 and by poppet actuator cylinder piston 24 with a one and one-half to one piston to valve poppet area ratio, the spring imposes only enough load to assure that the valve poppet 14 remains closed in the unpressurized condition, and the spring rate is selected to provide the proper valve opening differential.

For the illustrated embodiment, the spring load when the poppet is closed is 25 pounds and when fully open (a 2-inch stroke), it is 50 pounds. The piston/poppet ratio in the valve shown is 1.53 to 1, the piston area being 33.18 square inches and the poppet seal area for valve poppet 14 being 21.65 square inches. At the cracking pressure of 22.5 psi, the piston 24 is applying a closing force of 260 pounds on the poppet since it is continuously open to the pressure sensing line 22 which leads to tank 2 plus the 25 pounds spring force provided by compression spring 52 in its more relaxed, valve poppet closed position as shown in FIG. 1. This amounts to a total closing force of 285 pounds acting on the poppet seal providing a unit loading of 500 to 1,000 psi, well below the extrusion or excessive deformation limits of the seal material which preferably comprises Teflon.

In distinction to pressure relief valves of this type where the piston and poppet are both exposed to the main valve casing flow passage or cavity pressure, which creates stability problems, even in short sensing line installations, the employment of the header barrier 48 isolates the face of piston 24 which is subjected to pressure sensing and pressure from the main valve poppet 14 which is subjected to the main valve casing flow passage or cavity pressure.

Referring to FIGS. 2 and 3, the details in the construction of both the main poppet valve and the primary and secondary pilot valves and the fluid connections thereto may be seen. In this respect, the elements in the figures corresponding to those in FIG. 1 are at similar position. However, in FIGS. 2 and 3, the primary and secondary pilot valves define a plane which is essentially at right angles to the axis of the main valve poppet shaft 44 and valve casing 12.

In FIG. 2, the venturi section 30 of valve seat 28 comprises an annular ring formed of Teflon which is of L-shape in cross-section and is sandwiched between an L-shaped metal ring 100 which mounts to a shoulder 102 on the downstream side of the valve poppet 14, the annular valve seat 28 fitting within a peripheral recess 104 of the valve casing 12, while on the upstream side of the valve seat member 28, there is provided a second metal ring 106 positioned within an internal peripheral recess 108, the assembly being fixed by way of a plurality of screws 110 which threadably engage the valve casing 12 at venturi section 30. The shaft 44 is threaded at 112 to threadably receive the collar 50 which presses by way of washer 114 the valve poppet 14 against shoulder 116 formed by a radially enlarged portion 118 of the shaft 44. A Rulon bearing 120 is mounted within a peripherally relieved portion of the journal bearing or member 42 of spider 38 for rotatably supporting one end of the shaft 44. In like fashion, a cylindrical Teflon sleeve bearing 122 lies within journal bearing 46 for supporting the shaft 44 for rotation intermediate of its ends. Shaft 44 is provided with reduced diameter portions of decreasing size at 124, 126, 128 and 130, from right to left, FIG. 2. This permits the fixing of the actuator piston 24 to the shaft 44, and a vent actuator piston 132 to the shaft 44. Piston 132 abuts a shoulder 134 and is maintained thereby by a threaded collar 136. It may be seen in FIG. 2 that the valve actuating piston 24 is housed within a valve casing extension 56 which takes the form of a separate housing or casing which is mounted by way of flange 138 and an O-ring seal 140 to the side of the valve casing 12 and sandwiches the header barrier 48, at its periphery, between valve casing extension 56 and the valve casing tubular inlet portion 32. The casing extension 56 is mounted to the tubular valve casing 12 by bolts or screws or the like, (not shown). The transverse end wall 68 is apertured as at 142 and carries an O-ring 144 at the aperture to sealably and slidably support the reduced diameter portion 126 of shaft 44 which projects therethrough. A vent valve actuator cylinder 146 having an internal diameter on the order of the vent valve actuator piston 132 concentrically surrounds the reduced diameter portion of shaft 126 and is fixed at one end by screws 148 to the transverse end wall 68 of the casing extension 56. Shaft 44 terminates, at that end, within bore 148 formed within a projecting portion 149 of the transverse end wall 150 of the vent valve actuator cylinder 146. The vent valve actuator piston 132 therefore defines with the end wall 150 of the vent valve actuator cylinder 146 a chamber 152 which opens by way of radial port 154 and threaded counterbore 156 within the side of the cylinder 146 to form a threaded connection for a vent actuation helium pressure line (not shown) permitting the chamber 152 to be pressurized irrespective of fluid pressure conditions within the valve actuating chamber 72 and the valve control chamber 70, to force the valve poppet 14 to full open position against the bias of compression spring 52.

Preferably, the projection 149 of end wall 150 mounts a pair of indicating switches comprising a full closed indicating switch 158 and a full open indicating switch 160 which may be of the type sold by Honeywell Corporation under the trade designation MS-25, these switches being fixedly mounted to switch housing 162. The end wall projection 149 slidably supports plungers 164 and 166 at right angles to shaft 44, respectively, for switches 158 and 160. Plunger 164 bears at one end, remote from switch 158, on a tapered tip 168 of shaft 44 when the valve poppet 14 is in full closed position, with the plunger 164, being pressed against the tapered tip 168 by a spring biased actuator arm 170 of the full closed indicator switch 158. In like fashion, an actuator arm 172 of the full open indicator switch 160 bears against plunger 166 which is pressed towards the bore 148 within end wall extension 149. When the valve shifts to full open position, the shaft 44 moves to the right such that the tapered tip portion 168 underlies the plunger 166, permitting the plunger 166 to shift axially to change the state of the switch 160 to indicate valve full open position.

In terms of the structural make-up and operation of the primary and secondary pilot valves, further reference may be had to FIGS. 2 and 3. As shown in FIG. 3, the primary pilot valve 18 and the secondary pilot valve 20 are positioned to the right and left respectively of the vent valve actuator indicated generally at 145, the pilot valves being mounted to the manifold or member 74. Manifold 74 constitutes a machined housing which is bolted or screwed by way of screws 180 to the face of transverse wall 68 of the poppet actuator 16. The manifold 74 and the poppet actuator housing end wall 68 forming the fluid passage 76 leads to valve actuating chamber 72. The right angle horizontal passage 182, which extends inwardly from one side of the manifold member 74 and is closed off by plug 184, fluid connects passage 76 to passage 78 which is closed off by plunger 80 and defines the valve seat of the primary pilot valve 18. Passage 78 is formed by a vertical bore from the top of the manifold which is counterbored at 186 and 188 to form a chamber 191 within which the lower housing section 190 of the primary pilot valve 18 seats. The upper primary pilot valve housing section 192 is threaded to the lower primary pilot valve housing section 190 as at 194, these elements being formed of cast or machined metal. The primary pilot valve housing is generally cylindrical with the plunger being slidably mounted by way of a Teflon bearing or the like as at 196 within housing section 190, the plunger 80 being fixed by a circular plate 198 to the lower end of metal bellows 199 which forms a part of a bellows assembly 200 and which seals an upper compartment 202 from the lower compartment 204 of the primary pilot valve. The lower compartment 204 opens to passage 78 by way of small diameter holes 206 permitting the lower compartment 204 to be at the pressure of the pressure sensing line 22 by way of a horizontal passage 82 which opens to chamber 191 of counterbore 186 by way of threaded nipple 208 and tubing 210 opening directly into the side of the ullage pressure sensing line 22. Line 22 leads directly to the valve control chamber 70 by way of a threaded connection 212 within casing extension 56.

The upper end of plunger 80 bears against the bottom of a circular plate 214, upon the top of which a coil compression spring 216 bears; the other end of the spring 216 bearing against a second plate 218 whose vertical height is adjusted by means of a threaded adjustment screw 220 which projects through the upper primary pilot valve housing 192 and is locked at a given axial position by means of a lock nut 224. The upper chamber or compartment 202 of the primary pilot valve is fluid connected by way of conduit or line 226 to an overboard vent line 88, through a passage defined by a horizontal bore 228 on the opposite side of the manifold member 74 from bore 82. A threaded nipple or coupling 230 permits fluid communication between tube 226 and the horizontal bore 228. Bore 228 communicates to vertical bore 94, counterbore 230 and a further counterbore 232 and thus to the secondary pilot valve 20.

The secondary pilot valve 20 also is similar to the primary pilot valve, being formed of a two part housing or casing including a lower casing or housing section 234 and an upper housing section 236, the two sections being threadably coupled as at 238 and forming in conjunction with bellows assembly 240 an upper chamber 242 and a lower chamber or compartment 244 separated by an expandable metal bellows 246. The bellows 246 is fixed to casing section 234 at its lower end by way of an annular ring member 248 with the upper end of the bellows 246 being fixed to the periphery of a circular disc 250 which is fixed to the secondary pilot valve plunger 92. A coil spring 252 is compressed between disc 250 and a second disc 254 which bears against the bottom of a threaded adjustment screw 256 which is locked by way of a lock nut 258 to provide calibration for the secondary pilot valve. The secondary pilot valve plunger 92 is further provided with an integral, enlarged diameter portion 260 and one end of a compression spring 262 bears against the lower face of that radial enlargement and the other end of the compression spring bears against the bottom of the lower casing section 234, these members being mounted within the lower compartment or chamber 244 of the secondary pilot valve. The plunger 92 which in its area of contact with passage 94 forms a valve seat at this point which is of a larger cross-sectional diameter than plunger 80 with its valve seat at passage 78. Appropriately, a Teflon bearing 264 slidably supports the plunger 92 for axial shifting between the secondary pilot valve open and closed positions. The upper chamber 242 of the secondary pilot valve is in fluid communication with the ullage pressure sensing line 22 by way of a fluid conduit 90 as defined by a tube which opens to the manifold passage 82 by way of a threaded nipple or fitting at 268 and is connected to the upper casing section 236 of the secondary pilot valve by way of a similar threaded fitting 270. One or more ports 272 within the lower casing section 234 of the secondary pilot valve permits the lower chamber 244 beneath the bellows 246 to be at a pressure of the overboard vent passage 228 leading to vent line 88 (not shown in FIG. 3) but being coupled thereto by way of manifold threaded counterbore 274.

Initially, the actuator pistons 80 and 92 of the primary and secondary pilot valves 18 and 20, respectively, are in the positions shown in FIG. 3, and the shaft 44 and actuator piston 24 as well as the valve poppet 14, all of which are fixed to shaft 44, are in the positions shown in FIG. 2. These positions correspond to the position of the elements in FIG. 1. However, particularly with respect to FIG. 3, the operation of the primary and secondary pilot valves will become readily apparent. Since vent line 88 is open to the ambient by way of the open discharge end 36 of the valve casing 12, and the valve poppet 14 is in full valve closed position and against seat 28, the ambient pressure acting within passage 228 and through line 226 leading to the upper chamber 202 of the primary valve casing, permits the compression spring 216 to maintain plunger 80 in its depressed or valve closed position, cutting off passage 76 leading to the valve actuator chamber 72 from the ullage pressure sensing line 22. However, that pressure is transmitted by way of conduit 210 and passage 82 to the lower chamber 204 through ports 206 within the bottom of the primary pilot valve lower casing section 190. In the examplary embodiment of the invention, the bellows 200 is compressed as the pressure reaches 22.5 psi and the primary pilot valve reaches full vent flow at 23.5 psi, this action compressing the coil spring 216. Flow also passes through bleed or control orifice 86 to the horizontal passage 228 leading to the vent line 88. The pressure on the left side of the actuating piston 24 increases, but because of orifice 86, full ullage pressure is not reached in valve actuating chamber 72. At 22.7 psi when the flow through the primary pilot valve 18 and the orifice 86 develops a pressure of 8.62 psi in the valve actuating chamber 72, the poppet and piston assembly will just balance and start to open and vent. If the pressure increases requiring higher flows, the pilot valve will open more, increasing the pressure in the valve actuating chamber 72 to overcome both the additional spring force (provided by the compression of spring 52) and the increased pressure differential force. The valve 14 opens fully when the pressure in the valve actuating chamber reaches approximately 9.80 psi.

The secondary pilot valve comes into play and opens below a set pressure, in this case a pressure set at 22 psi as determined by adjustment of the adjustment screw 256. Whenever the pressure within the ullage pressure sensing line 22 is below this level, the secondary pilot valve is wide open. If the main pilot valve should fail open, and open the main valve poppet 14, the pressure in the ullage will drop to 22 psi, and the secondary pilot valve will open to control the pressure between 21 and 22 psi by venting the excess flow from the valve actuating chamber 72 and the failed main pilot valve; in the event this secondary pilot valve should fail (it is normally non-flowing), the main valve poppet 14 will fail shut. However, as a non-flowing valve, this is unlikely.

Alternatively, to provide a completely fail safe main valve poppet with two or more failures required to fail the valve open or closed, a second step pilot valve may be added, and it will provide the margin required to exceed the flow of the secondary pilot valve. This likewise would be a "non-operating" valve. In addition to secondary pilot relief valve 20 or in lieu thereof, a third pilot relief valve may be positioned within passage 76 to further vent chamber 72, other than by way of restriction 86, at a pressure in excess of 23.5 psi to provide a "higher" set point for system operation upon primary pilot valve failure which results in continuing pressure build up in the tank beyond that causing primary pilot relief valve 18 operation and opening of the main relief valve poppet 14.

With the basic pressure level control established, the actuation of the isolated piston poppet mechanism is in order. In effect, the isolated pressure, through pressure sensing line 22, acting on the piston acts as an infinte rate gas spring, maintaining a constant pressure on the piston (considering the time limits of a long gas circuit). When the poppet 14 opens, the pressure in the main pressure relief valve chamber will decrease, and a decrease in pressure will reduce the force acting on the poppet 14. If the pressure on the piston is constant, the piston will immediately reduce the flow to control any possible overflow. In the event of an "organ pipe" surge, which might be set up within the large vent line 8 as a result of flow starting, a surge of pressure results in a higher flow of gas as long as the pressure is higher, and a lower flow on the low end of the oscillation, until the oscillation was damped out. Thus, the valve will be essentially self-damping in the nature of well designed, positive flow relief valves.

While the invention has been particularly shown and described with reference to a preferred embodiment thereof, it will be understood by those skilled in the art that various changes in form and details may be made therein without departing from the spirit and scope of the invention.

What is claimed is:

1. An oscillation damping pressure relief valve comprising:
   a tubular main valve casing forming a main flow passage and having an inlet end open to a source of fluid under pressure,
   means defining a circular valve seat within said main flow passage downstream of said inlet end,
   a main valve poppet coaxially mounted within said flow passage casing for movement in the direction of fluid flow from said source and away from said valve seat from a first, closed position to a second, open position,
   a poppet valve actuator piston operatively coupled to said valve poppet and fluid isolated from said main valve passage,
   biasing means for normally biasing said valve poppet to said first, fully closed position in absence of fluid connection of said main valve casing to said pressure source,
   casing means sealably and slidably supporting said actuator piston and defining first and second sealed chambers on opposite sides of said actuator piston and fluid isolated from said flow passage, said actuating piston having a larger effective surface area than that of said valve poppet,
   means for continually subjecting said first chamber to said source pressure such that said actuator piston maintains said valve poppet at said first, fully closed position,
   a primary pilot valve for connecting said second chamber to said fluid pressure source when said fluid pressure source reaches a predetermined value to balance the forces acting on said actuator piston and said valve poppet and permit the source pressure to overcome the biasing force of said biasing means to shift said poppet valve from said first, closed position towards said second, open position, and
   means for venting a portion of the flow from the fluid pressure source through said primary pilot valve to said second chamber such that the fluid pressure slowly increases within the second chamber upon operation of the primary pilot valve and is maintained substantially below the fluid pressure within said first chamber.

2. The oscillation damping pressure relief valve as claimed in claim 1, further comprising a secondary pilot valve responsive to change in source pressure by a given amount from that predetermined pressure effecting operation of the primary pilot valve for additionally venting said second chamber and to thereby insure modulation of said main valve poppet in response to source pressure change to insure achieving a proper pressure relief function when said secondary pilot valve fails either open or closed.

3. The oscillation damping pressure relief valve as claimed in claim 1, wherein said valve casing comprises an essentially cylindrical tube, a shaft member is mounted coaxially within said tube for axial shifting, said shaft extends through a header barrier which spans said tube and fluid isolates said actuator piston from said main valve poppet and means including said header barrier and said cylindrical casing defining said first and second chambers on respective sides of said actuator piston.

4. The oscillation damping pressure relief valve as claimed in claim 2, wherein said valve casing comprises an essentially cylindrical tube, a shaft member is mounted coaxially within said tube for axial shifting, said shaft extends through a header barrier which spans said tube and fluid isolates said actuator piston from said main valve poppet and means including said header barrier and said cylindrical casing defining said first and second chambers on respective sides of said actuator piston.

5. The oscillation damping pressure relief valve as claimed in claim 3, wherein said main valve casing is essentially of tubular L-shape configuration including an elongated inlet duct which opens to a right angle base portion, and wherein said header barrier extends across said base portion adjacent and upstream of said inlet duct connection, and said main valve poppet is fixed to said shaft and spans across said base portion just downstream of said inlet duct and said base portion terminates in an outlet end which includes a fixed spider extending transversely across the flow passage defined by said valve casing base portion, and said header barrier and said spider each comprise journal bearings for said slidable shaft, and a compression spring is mounted concentrically surrounding a portion of said shaft and is compressed between said spider and said main valve poppet for biasing said valve poppet towards said header barrier and in valve closed position against said seat.

6. The oscillation damping pressure relief valve as claimed in claim 4, wherein said main valve casing is essentially of tubular L-shape configuration including an elongated inlet duct which opens to a right angle base portion, and wherein said header barrier extends across said base portion adjacent and upstream of said inlet duct connection, and said main valve poppet is fixed to said shaft and spans across said base portion just downstream of said inlet duct and said base portion terminates in an outlet end which includes a fixed spider extending transversely across the flow passage defined by said valve casing base portion, and said header barrier and said spider each comprise journal bearings for said slidable shaft, and a compression spring is mounted concentrically surrounding a portion of said shaft and is compressed between said spider and said main valve poppet for biasing said valve poppet towards said header barrier and in valve closed position against said seat.

7. The oscillation damping pressure relief valve as claimed in claim 6, wherein said valve casing base portion terminates on the side of said actuator piston opposite that of said header barrier in a transverse end wall, said end wall carries a vent valve actuator cylinder concentrically surrounding a portion of said shaft, a vent valve actuator piston is fixed to said shaft and sealably and slidably mounted within said vent valve actuator cylinder with said cylinder defining with said vent valve actuator piston a pair of sealed fluid chambers on each side thereof, and means for subjecting the vent valve chamber remote from said valve poppet to a source of fluid pressure sufficient to overcome the bias of said compression spring and said source pressure acting on said actuator piston within said first chamber to open said valve poppet.

8. The oscillation damping pressure relief valve as claimed in claim 6, wherein said valve shaft terminates at its end outboard of said vent valve actuator cylinder in a peripherally relieved surface, and said pressure relief valve further comprises first and second axially spaced and fixedly positioned microswitches and slidable actuator pins operatively positioned between said microswitches and said shaft responsive to shifting of said poppet valve and said valve shaft between said valve poppet first and second positions and alternate alignment of said peripherally relieved surface of said shaft with respective microswitch actuator pins for varying the state of said microswitches.

* * * * *